UNITED STATES PATENT OFFICE 2,658,086

BROMINATION OF POLYHALOMETHANES

Robert P. Ruh and Ralph A. Davis, Midland, Mich., assignors to The Dow Chemical Company, Midland, Mich., a corporation of Delaware No Drawing. Application July 2, 1952,
Serial No. 296,927

9 Claims. (Cl. 260—653)

This invention relates to the bromination of polyhalomethanes, particularly difluoromethane and trifluoromethane.

In the vapor phase halogenation of fluoromethanes, it has been observed that chlorine reacts much more rapidly than bromine. For instance, difluoromethane will react with chlorine at a practical rate at temperatures of 100° to 400° C. On the other hand, when bromine is to be reacted with difluoromethane, temperatures of 400° to 600° C. are required for satisfactory results.

It has now been found, quite surprisingly, that when a mixture of chlorine and bromine is contacted at elevated temperatures with a polyhalomethane, particularly a fluoromethane, the preponderant reaction is bromination rather than chlorination. Further, bromination in the presence of chlorine occurs more readily, and at a lower temperature, than when bromine alone is used as the brominating agent. At the preferred conditions for the reaction, most of the bromine undergoing reaction enters the polyhalomethane molecule and by-product hydrogen halide is largely hydrogen chloride rather than hydrogen bromide.

The principal object of the invention is to provide an improved method for producing bromofluoromethanes, particularly bromodifluoromethane, dibromodifluoromethane, and bromotrifluoromethane. More specific objects and advantages are apparent from the specification, which illustrates and discloses, but is not intended to limit the invention.

According to the invention, a polyhalomethane containing at least one hydrogen atom and at least one fluorine atom and no iodine in the molecule is brominated when heated at a reaction temperature in the range of 200° C. to 500° C. with a mixture of bromine and chlorine. The invention is particularly applicable to a fluoromethane of the group consisting of difluoromethane and trifluoromethane. Other polyhalomethanes which may be brominated by the process of the invention are bromodifluoromethane, chlorodifluoromethane, chlorofluoromethane, dichlorofluoromethane, etc.

It is not understood by what mechanism chlorine and bromine react with a polyhalomethane to brominate the latter. However, it has been discovered that halogenation is preponderantly bromination rather than chlorination when bromine and chlorine, in a molecular proportion greater than 0.7:1, are reacted with a polyhalomethane in the temperature range of about 200° to 500° C. More desirably, an equimolecular or greater than equimolecular ratio of bromine to chlorine is preferred.

The bromination of polyhalomethanes may be carried out employing an equimolecular proportion of halogen, i. e., total bromine and chlorine, theoretically required to effect the desired degree of bromination. To completely monobrominate a polyhalomethane, it is theoretically necessary to employ at least an equimolecular proportion of halogen consisting of a mixture of bromine and chlorine and containing at least 0.5 mole of bromine per mole of polyhalomethane. Although reaction will proceed with less than equimolecular proportions of halogen to polyhalomethane, it is usually desirable to employ greater than an equimolecular proportion of halogen. The halogen mixture should preferably contain an equimolecular or greater than equimolecular proportion of bromine to chlorine, with up to a 10:1 or higher ratio being operable. Depending on other variables such as temperature, contact time, and degree of bromination desired, a mole ratio of halogen (total bromine and chlorine) to polyhalomethane of greater than 1.5:1 is generally preferred although any ratio from 1:1 to 10:1 or higher may be employed when the molecular proportion of bromine to chlorine is greater than 0.7:1. A large excess of total halogen, though unnecessary, may be used. This is generally not desirable in plant operation, however, due to the problems connected with the recovery of unreacted halogen.

The bromination of a polyhalomethane by the method of the invention is carried out in the vapor phase at a temperature in the range of about 200° to 500° C. Within this range, other factors remaining constant, the optimum temperature for bromination varies with the polyhalomethane to be brominated. For example, difluoromethane can be brominated in accord with the invention at about 200° C. and bromination will proceed at a practical rate within the temperature range of about 300° to 400° C. Trifluoromethane on the other hand, requires a temperature of from 400° C. to 500° C. for bromination. It is significant, however, that difluoromethane and trifluoromethane may be brominated at a practical rate at a considerably lower temperature with a mixture of bromine and chlorine, i. e. according to the process of the invention, than has heretofore been possible with bromine alone.

Temperature to a large extent governs the contact time preferably employed in the practice of the invention. In general, a sufficiently long time of contact is employed to effect the desired amount of reaction between the reactants at a given temperature. Contact times of from 1 to 30 seconds are usually employed in carrying out the invention. Longer contact times up to 60 seconds may be employed, e. g. in the bromination of difluoromethane at approximately 200° C. Conversely, a contact time of only a fraction of a second may be used when higher temperatures are employed. Usually, however, contact times in the range of 1 to 30 seconds are suitable.

Bromination according to the invention proceeds in the absence of solid catalysts and may be carried out either batchwise or continuously. It is preferred that the process be conducted continuously, because the reaction is more easily carried out, and because better yields result. When a continuous process is employed, any convenient reaction vessel, e. g. a cylindrical reaction tube, which is inert under the conditions of the reaction may be used. In order to increase the effective heat transfer surface, the reactor is generally packed with a material inert to the reactants and to the products, such as refractory pebbles, silica beads, etc. Usually atmospheric or slightly greater than atmospheric pressures are employed although bromination may be conducted at either subatmospheric or superatmospheric pressures.

The following examples illustrate the process of the invention, but are not to be construed as limiting the scope thereof.

Example 1

Difluoromethane was brominated at three different temperatures in a vertical reactor consisting of a silica tube one inch in inside diameter by 30 inches in length packed to a height of 24 inches with an inert heat transfer medium consisting of beads of silica gel. A 24 inch muffle furnace surrounding the upright reaction tube was employed to maintain the desired temperature as measured by a thermocouple placed on the outside of the tube near the middle of heated zone. Difluoromethane gas was measured and passed through a glass vaporizer containing liquid bromine, the temperature of which was regulated to give the desired ratio of $CH_2F_2$ to $Br_2$. Metered chlorine gas, together with the $CH_2F_2$—$Br_2$ mixture, was introduced into the top of the reaction tube. After passing through the reactor, the effluent gases were scrubbed in water and aqueous sodium hydroxide, and were then dried with calcium sulfate and condensed in a receiver cooled in a Dry Ice-methylene chloride mixture. The organic product was later separated into its component parts by fractional distillation in a Podbielniak column. The data for the three runs are contained in the following table.

BROMINATION OF $CH_2F_2$

| | | | | |
|---|---|---|---|---|
| $CH_2F_2$ | Moles | 0.65 | 0.71 | 0.71 |
| $Br_2$ | do | 0.52 | 0.78 | 2.25 |
| $Cl_2$ | do | 0.5 | 0.70 | 0.92 |
| $CH_2F_2/Br_2/Cl_2$ | do | 1/.8/.77 | 1/1.1/.99 | 1/3.16/1.28 |
| Reaction temperature. | °C | 250 | 300 | 350 |
| Contact time | Sec | 23 | 21 | 11 |
| Duration of run | Min | 90 | 120 | 120 |
| Product recovery: | | | | |
| $CBr_2F_2$ | Mole percent | 14.5 | 19.1 | 36.6 |
| $CHBrF_2$ | do | 32.0 | 41.3 | 39.0 |
| $CClBrF_2$ | do | 4.2 | 3.8 | 1.7 |
| $CHClF_2$ | do | 13.9 | 10.1 | 4.5 |
| $CH_2F_2$ | do | 8.2 | 11.7 | 7.5 |
| Total organic recovery. | do | 72.8 | 86.0 | 89.3 |
| $Br_2/Cl_2$ in product | Moles | 3.6/1 | 6.0/1 | 18.4/1 |

Example 2

Trifluoromethane was brominated in the same equipment and according to the general procedure of Example 1. Through the reaction tube heated to about 450° C. were passed 0.78 mole of trifluoromethane, 4.8 moles of bromine, and 0.94 mole of chlorine during a period of 140 minutes. Slightly greater than half of the trifluoromethane was converted to halogenated products. Based on the trifluoromethane charged, 36.6 mole per cent bromotrifluoromethane and 16.7 mole per cent chlorotrifluoromethane were separated from the product by fractional distillation in a Podbielniak column.

What is claimed is:

1. A method of brominating polyhalomethanes which comprises contacting in a heated zone at a reaction temperature in the range of 200° to 500° C. for a time sufficiently long to effect reaction, a polyhalomethane containing at least one hydrogen, at least one fluorine, and no iodine with a mixture of bromine and chlorine in a mole ratio of bromine to chlorine greater than 0.7:1.

2. A method according to claim 1 wherein the polyhalomethane is a fluoromethane of the group consisting of difluoromethane and trifluoromethane.

3. A method according to claim 2 wherein the contact time is from 1 to 30 seconds.

4. A method of brominating difluoromethane which comprises passing through a zone heated to a temperature between about 300° and 400° C. at a rate corresponding to a contact time of from 1 to 30 seconds, a vapor phase mixture of difluoromethane and at least an equimolecular proportion of halogen consisting of a mixture of bromine and chlorine in a mole ratio greater than 0.7:1.

5. A method according to claim 4 wherein the mole ratio of halogen to difluoromethane is from 1:1 to 5:1.

6. A method according to claim 5 wherein the reaction is conducted in a packed tube.

7. A method of brominating trifluoromethane which comprises passing through a zone heated to a temperature between about 400° and 500° C. at a rate corresponding to a contact time of from 1 to 30 seconds, a vapor phase mixture of trifluoromethane and greater than 1.5 molecular proportions of halogen consisting of a mixture of bromine and chlorine in a mole ratio greater than 1:1.

8. A method according to claim 7 wherein the reaction is conducted in a packed tube.

9. In a bromination method wherein a polyhalomethane containing at least one hydrogen, at least one fluorine, and no iodine is passed together with bromine through a zone heated to a temperature in the range of 200° to 500° C. for a time sufficiently long to effect reaction, the improvement which comprises carrying out the bromination in the presence of chlorine in a molecular proportion of at least 0.1 that of the bromine.

ROBERT P. RUH.
RALPH A. DAVIS.

No references cited.